United States Patent [19]

Harris

[11] 4,117,756

[45] Oct. 3, 1978

[54] VERTICAL BAND SAW AND FEED TABLE

[76] Inventor: Gerald R. Harris, 1230 Camelia Dr., Livermore, Calif. 94550

[21] Appl. No.: 732,107

[22] Filed: Oct. 13, 1976

[51] Int. Cl.² .................. B23D 53/04; B27B 13/00
[52] U.S. Cl. ............................. 83/801; 83/486.1; 83/794
[58] Field of Search .................. 83/801, 794, 486.1

[56] References Cited

U.S. PATENT DOCUMENTS

| | | | |
|---|---|---|---|
| 1,233,836 | 7/1917 | Blum | 83/801 |
| 1,280,341 | 10/1918 | Wardman | 83/801 |
| 1,867,275 | 7/1932 | McCarter | 83/486.1 |
| 2,555,056 | 5/1951 | Pence | 83/486.1 |
| 2,958,347 | 11/1960 | Blum et al. | 83/801 |
| 3,474,693 | 10/1969 | Wilkie et al. | 83/801 |

Primary Examiner—Donald R. Schran
Attorney, Agent, or Firm—Warren, Chickering & Grunewald

[57] ABSTRACT

A band saw having a generally vertically oriented saw blade carrying frame mounted to a movable carriage is disclosed. The carriage is mounted in a horizontally extending guideway in the saw base by an arm which is cantilevered from the back side of the vertical saw frame for support and guided motion of the saw from a relatively debris free portion of the saw base. Additionally, the band saw includes a work piece supporting bar feed table having a movable vise which is stabilized against backward tilting and a roller support assembly constructed so as to accommodate load concentrations from heavy, bent bar stock. Finally, an improved band saw blade guiding assembly is disclosed.

1 Claim, 12 Drawing Figures

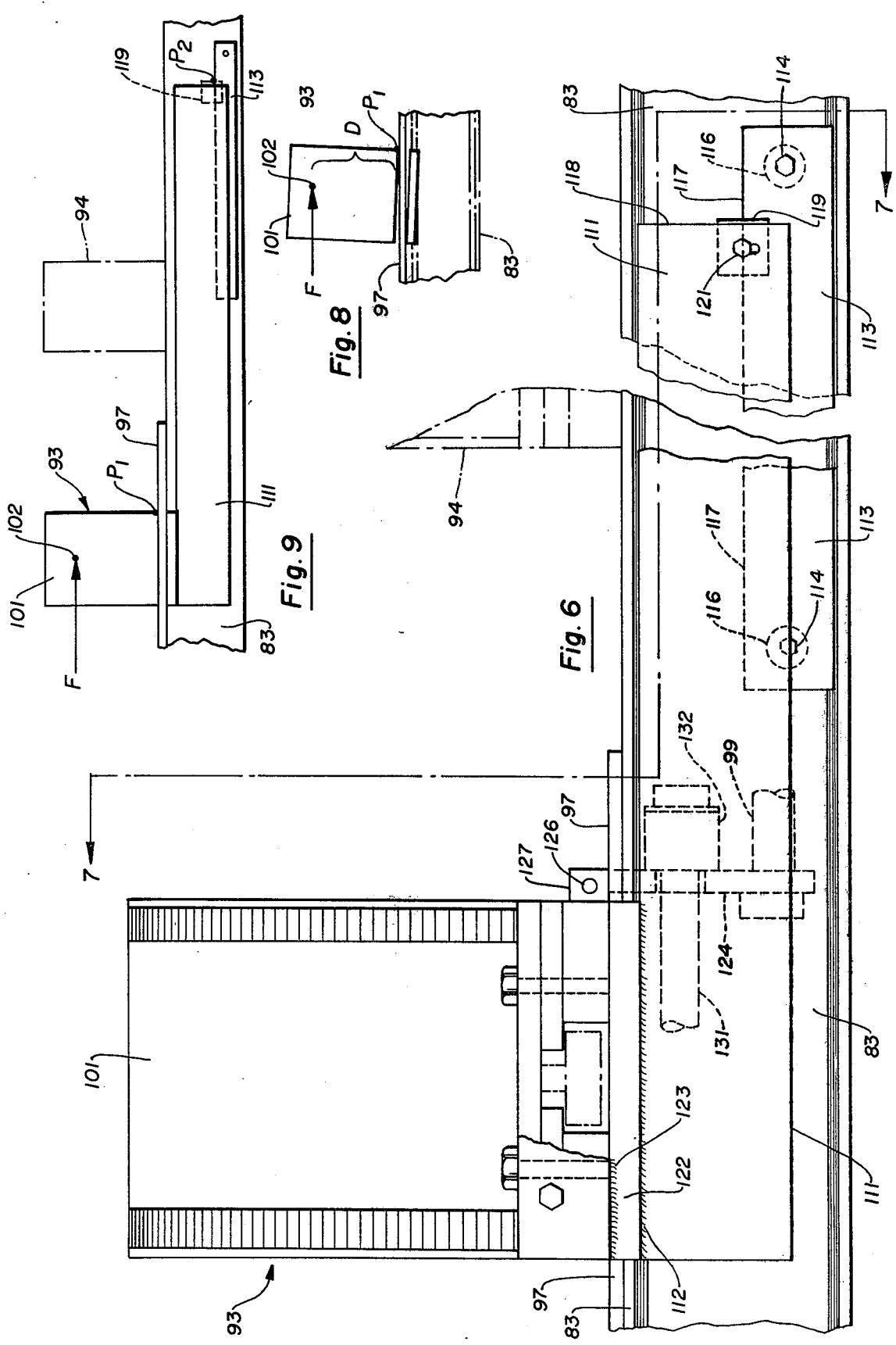

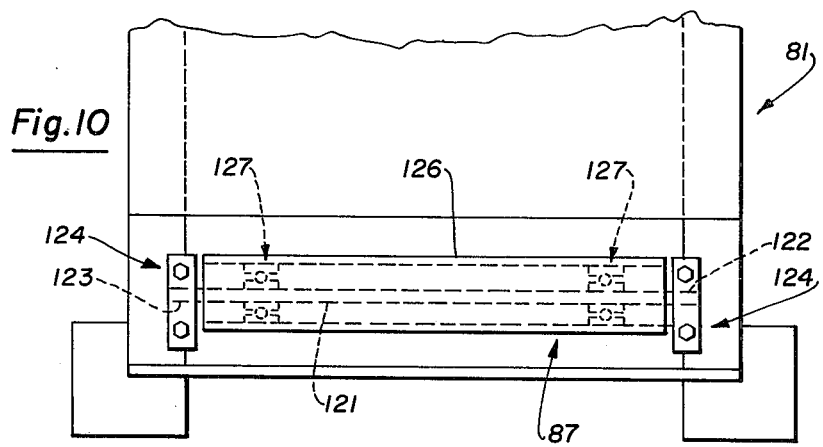
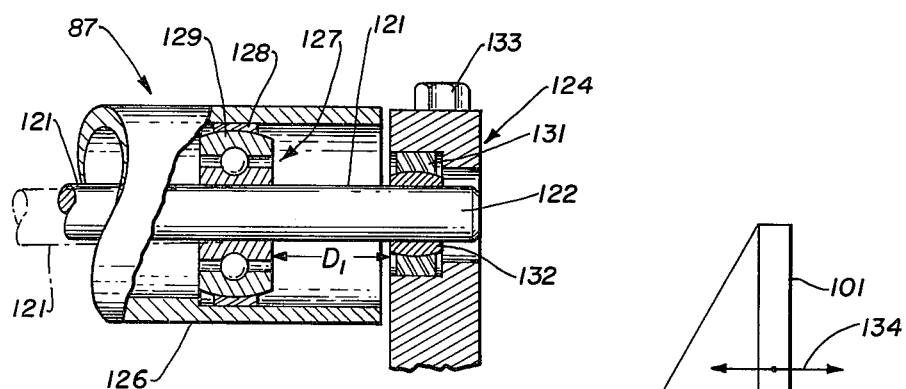
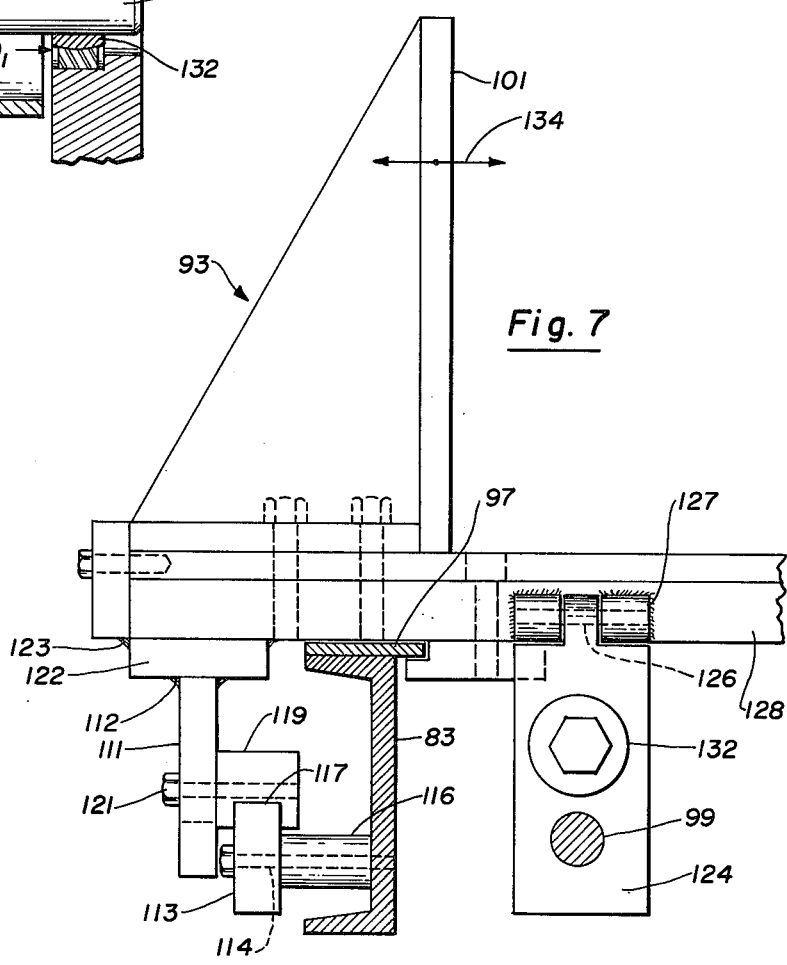

VERTICAL BAND SAW AND FEED TABLE

BACKGROUND OF THE INVENTION

Two broad classes of band saws are widely used in industry for metal cutting. One type can be described as a horizontal band saw, such as is shown in my U.S. Pat. No. 3,682,030. The second type is the vertical band saw, that is, a saw having a generally vertically oriented band saw carrying frame. In some vertical band saws, the work piece being cut must be advanced past the stretch or cutting portion of the saw blade, for example, in U.S. Pat. No. 2,601,095. In vertical band saws designed for heavier and more precise work, however, the saw blade carrying drive and idler wheels are mounted on a frame which is supported on a movable carriage so that the work piece is held in a stationary or fixed position and the vertically oriented saw blade is horizontally advanced through the work piece from one side to the other.

Typically such vertical band saws are constructed with a carriage which is supported from the stationary base of the band saw by means of a plurality of roller bearings mounted in tracks or channels on opposite sides and underneath the work piece supporting cutting table. Thus, prior art vertical band saws have included a carriage structure which extends outwardly of both sides of the saw blade and usually to a position even with or in advance of the saw blade. Rollers are mounted to the carriage and support the saw blade assembly for horizontal movement in tracks or channels in the saw base. The band saw is also further provided with a hydraulic or pneumatic cylinder which controls the horizontal advancement of the carriage.

While prior art vertical saws have been found to be highly advantageous for many applications, they have also been found to have a common problem, namely, the ability of cutting chips and other debris to become lodged or deposited in the carriage guiding tracks of the saw base. Band saw cutting operations, particularly those which are automated by feed tables and the like, are inherently relatively contaminated environments. Thus, chips, cutting oil, dirt, and other debris are commonly dispersed or showered over the saw cutting table and frame. While most of these materials are caught and collected by chip pans and the like, invariably some of these contaminants are not so collected and become lodged in the carriage guiding tracks. Such debris can impede the smooth and uniform stroke or horizontal movement of the saw blade carriage. The result can be inaccurate cuts produced by saw blade misalignments and varying cutting pressures.

Another source of inaccurate band saw cutting is the band saw feed table. It is a well known and highly desirable practice to employ automatic feed tables to feed bar stock or the like to vertical band saws and other machine tools. Typically, such feed tables include at least one movable vise which is formed to grip the work piece, move toward the machine tool until a stop is reached, hold the work piece until it is cut, release the work piece until it is cut, release the work piece and move away from the machine tool to re-grip the work piece and repeat the cycle. While such automatic feed tables have many advantages, it is also well known that they can introduce problems which result in inaccurate cutting, for example, misalignment and an inability to cut to the proper length. Some of the problems which have heretofore been solved with such automatic feed tables are described in my prior U.S. Pat. No. 3,504,585. As is noted in my prior patent, it is highly desirable for a feed table vise to be able to shift horizontally in a direction laterally of the work piece to accommodate slight misalignments and bends which may exist in the bar stock. While my prior patent discloses a movable vise in which this problem is eliminated, I have also encountered a tendency for the movable vise in such automatic feed tables to tilt about a horizontal axis transverse to the work piece. Thus, when the vise grips the work piece and advances the same toward the machine tool until it reaches a stop, there is some tendency for the vise to tilt in its viseways backwardly or away from the machine tool. This tilting action can cause the saw to cut the work piece inaccurately. Correction of this problem should not be accomplished at the sacrifice of the necessary lateral freedom of the vise.

Another source of cutting inaccuracy similar to backward tilting of the vise can be produced when the piece of stock is slightly bent or warped about a horizontal axis so that it is bowed up or down as supported on the feed table. Such bending or misalignment of the work piece can produce extremely high load concentrations on the roller support assemblies of the feed table. Thus, a bent work piece can be severely enough misaligned so that substantially the entire weight of the work piece will be concentrated on a single roller assembly. Such concentrated support can cause several problems including rapid fatiguing of the roller assembly and pivoting of the work piece on the roller assembly so as to tilt the same at the area in which the cut is occurring. The feed table roller supports, therefore, should additionally compensate for unusual load concentrations as a result of work piece bowing or misalignment in a vertical direction.

A final source of cutting inaccuracy which is commonly encountered in connection with band saws has been the cutting and inaccuracy produced by saw blade guide assemblies. Conventional guide blade assemblies, such as is disclosed in my U.S. Pat. No. 3,848,493, employ extremely high strength saw blade engaging guide elements or pads, usually formed of tungsten carbide or the like. These high strength, hard guide blade elements engage the sides and back of the blade and often are required to twist the blade by 90° to provide a cutting stretch which is properly oriented. Such carbide saw blade guides are quite adequate and satisfactory in their operation as long as they are properly lubricated. It is not uncommon, however, for saw operators to be somewhat inattentive with regard to blade lubrication. Accordingly, metal particles being sawed are sometimes driven along the saw blade and between the blade and the extremely hard carbide guides. When the lubrication is not adequate, the chips and particles begin to abrade the blade, reducing blade life and cutting accuracy. It is quite common, therefore, for band saw blades which are guided by carbide saw blade guides to become scored, pitted or dull as a result of inadequate lubrication and passage of chips between the very hard carbide guides and the softer steel blade.

Accordingly, it is an object of the present invention to provide a vertical band saw having a carriage which is mounted for guided movement in a manner enhancing cutting accuracy and reliability.

Another object of the present invention is to provide a vertical band saw having a movable carriage which is less susceptible to interference in the operation thereof from chips and other contaminants.

Still another object of the present invention is to provide a vertical band saw having a movable carriage which is extremely durable, affords improved cutting accuracy, and is inexpensive and relatively easy to manufacture.

Still a further object of the present invention is to provide an automatic feed table for a vertical band saw or other machine tool in which a movable vise is stabilized against backward tilting to enhance the accuracy of the machine tool operation.

Another object of the present invention is to provide a stabilizing means for a movable vise on an automatic feed table which can be easily and quickly attached or installed to existing equipment.

Still a further object of the present invention is to provide a stabilizing device for a movable vise on an automatic feed table which is simple in construction, highly durable and does not interfere with lateral vise freedom.

An additional object of the present invention is to provide a roller support assembly for use on a feed table for a vertical band saw or other machine tool which can accommodate load concentrations induced by work pieces which are warped or misaligned about a horizontal axis.

Another object of the present invention is to provide a roller support assembly for a feed table which has improved resistance to fatiguing.

Another object of the present invention is to provide saw blade guide means which greatly enhances saw blade life.

Still a further object of the present invention is to provide saw blade guide means which are constructed in a manner producing improved cutting accuracy and which are less susceptible to lubrication failures.

The present invention has other objects and features of advantage which will become apparent from the accompanying drawing and are set out in more detail hereinafter.

SUMMARY OF THE INVENTION

The vertical band saw of the present invention includes, briefly, a carriage having a vertical saw frame secured thereto which carriage is movably mounted to a saw base by means of an arm cantilevered from the rear or remote side of the frame so as to support the frame for movement from a position relatively shielded from debris and contaminants. In a second aspect, the invention includes a feed table having a vise stabilized against backward tilting by a bar which moves the pivot point of the vise to a more favorable location. Still further, a roller assembly is provided which utilizes bending of the assembly support shaft to eliminate stress concentrations. Finally, the invention includes plastic bearing material saw blade guides which are held in a positive pressure relationship to the saw blade to effect guiding of the same while greatly increasing blade life.

DESCRIPTION OF THE DRAWING

FIG. 6 is an enlarged, fragmentary, side elevational view of a portion of the feed table of FIGS. 1 and 2.

FIG. 7 is an end elevational view, in cross-section, taken substantially along the plane of line 7—7 of FIG. 6.

FIG. 8 is a schematic representation of a side elevational view of a conventional track-mounted movable vise.

FIG. 9 is a schematic representation of a side elevational view of a track-mounted movable vise constructed in accordance with the present invention.

FIG. 10 is an enlarged, top plan view of the area bounded by line 10—10 in FIG. 2.

FIG. 11 is a further enlarged, fragmentary, side elevational view of one end of the roller support assembly of FIG. 10.

DESCRIPTION OF THE PREFERRED EMBODIMENTS

Figure 1:
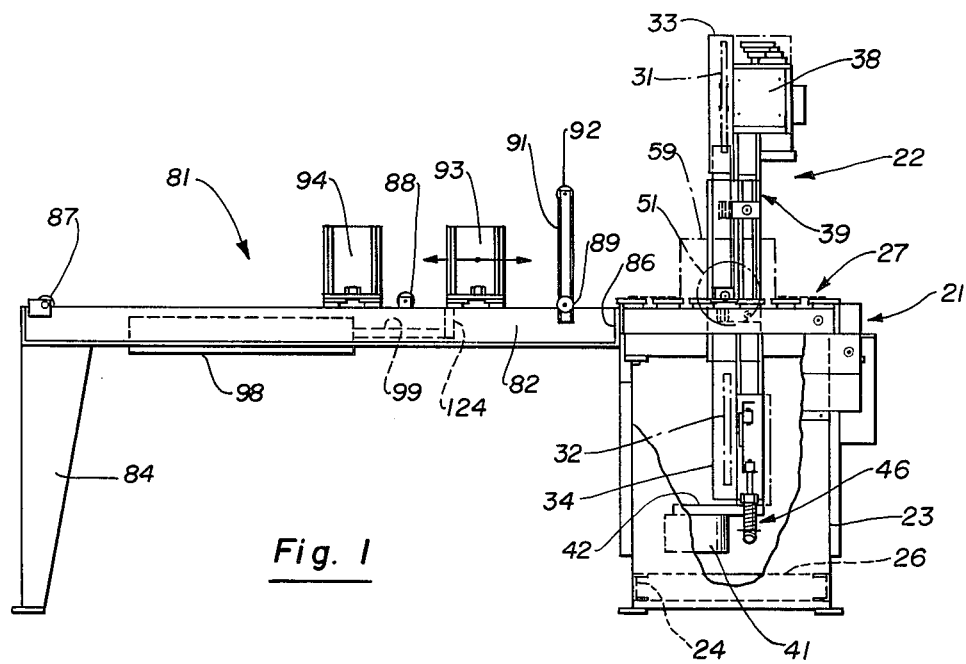
FIG. 1 is an end elevational view, partially broken away, of a vertical band saw and feed table constructed in accordance with the present invention.

The vertical band saw of the present invention can be seen in FIGS. 1 through 4 to include a stationary base portion 21 to which a carriage, generally designated 22, is movably mounted. Base 21 may be formed in a number of manners and usually includes upstanding legs 23 and cross brace members 24 to which chip pan 26 can be secured. Mounted to the upper portion of frame 21 is a work piece supporting cutting table, generally designated 27, with a removable member 25 having a slot or opening 28 therein for passage of saw blade 29 therethrough.

Carriage 22 includes a vertical saw frame 39 to which drive wheel 31 and an idler wheel 32 are rotatably mounted in general vertical alignment with saw blade 29 distended therebetween. Each of wheels 31 and 32 may be advantageously covered by housings 33 and 34, respectively, in order to provide operator safety. Also mounted to saw frame 39 is drive motor 36 which is operatively connected by belt 37 to gear reducer 38 which drives wheel 31.

Vertically extending saw frame beam 39 may advantageously be formed as two side-by-side plate-like members 30 and 40 connected together as a unit by spacers and end caps. Frame 39 forms the main structural support member for the entire movable portion of the saw. In order to counter balance the movable frame, weight 41 may be affixed by bracket 42 to the lower end of vertical frame member 39. The details of mounting of the band saw blade carrying wheels 31 and 32 to the vertical frame 39 through intermediate mounting elements 43 and 44 will not be described and are well known in the art. Similarly, the details of the adjustment means 46 for determining the tension in blade 29 do not form a portion of the present invention and it will not be described herein in detail.

As thus far described, the vertical band saw apparatus is conventional in construction and it is not regarded as being novel. In such conventional prior art vertical band saws, however, movable carriage 22 including saw frame 39 is supported with respect to base 21 by a pair of tracks which are positioned on either side of the movable carriage and run parallel thereto and underneath work piece supporting table 27. Thus, the saw frame would include laterally extending structural elements on which roller support assemblies were mounted for guided motion in the tracks provided on the band saw base.

In the improved vertical band saw of the present invention, carriage 22 has an arm 51 rigidly secured thereto and cantilevered therefrom at arm mounting plate 52, which in turn is secured by bolt 50 to plate 55 which is welded to vertical carriage beam 39. As best may be seen in FIGS. 3 and 4, arm 51 extends generally horizontally away from the rear or back side of the carriage or the side which is remote or opposite from the cutting area of the saw blade. Thus, arm 51 is cantilevered from the rearwardly facing side of carriage 22.

Base 21 is further formed with means, generally designated 53, defining a generally horizontally extending guideway into which arm 51 is mounted and cooperatively engaged. In the form of the vertical band saw of the present invention shown in FIGS. 1 through 4, guide means 53 is comprised of a plurality of roller elements 54a which engage the top of arm 51 and rollers 54b which engage the sides of arm 51. Supporting brackets 56a secure rollers 54a to cross members 57 which in turn are secured to longitudinal extending members 58 by bolts 58a. Rollers 54b are mounted to members 56b which are also supported from base member 58. Roller bearing elements 54a and 54b are preferably spaced apart along the length of arm 51 for rolling engagement with and support of arm 51 over the full length of motion of the carriage during cutting of the work piece.

Arm 51 may be advantageously formed as a rectangular tubular member. When so formed rollers 54a and 54b will secure arm 51 against rotation. Even though arm 51 is normally carefully formed, some variation can reasonably be expected. More particularly, it is not uncommon to find some slight twisting or angular rotation about the longitudinal axis of arm 51 over the length thereof. Guide means 53, therefore, is preferably formed to accommodate and compensate for such inaccuracies. First, it is preferable that pairs of rollers 54a be employed at the end of arm 51 closest to frame 39 to maximize the support of the arm proximate the movable carriage 22. In order to compensate for a possible twist in arm 51, however, a single roller 54a engages the top and bottom of arm 51 adjacent ehe end of the arm most remote from frame 39. Each of brackets 56a is further preferably provided with an adjustment means, such as bolts 60, which can be used to urge rollers 54a into contact with arm 51 despite slight variation in manufacturing tolerances of the arm. If desired, adjustments can include spring biasing means.

Figure 3:
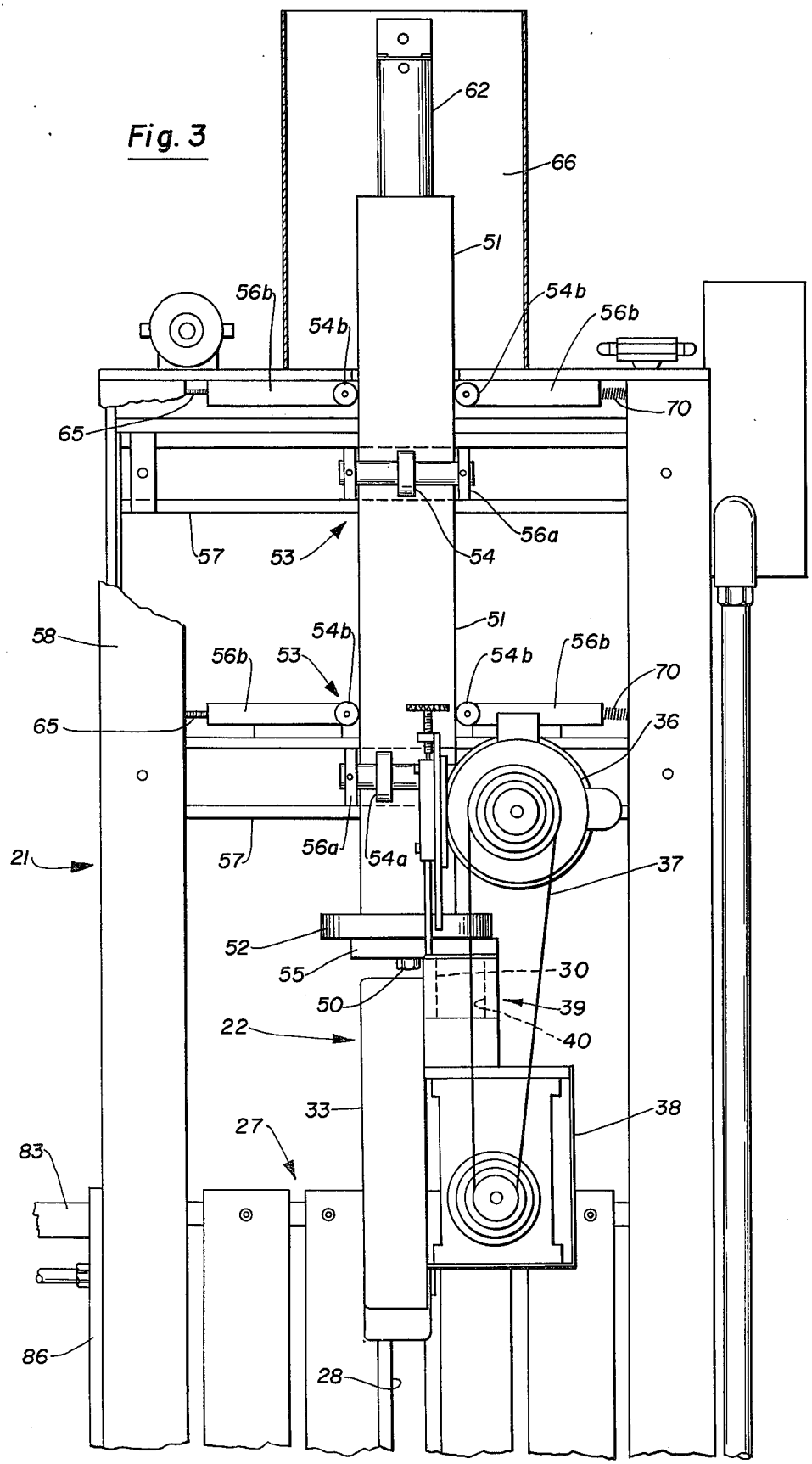
FIG. 3 is an enlarged, fragmentary, top plan view of the vertical band saw portion of the apparatus of FIG. 2.
Figure 4:
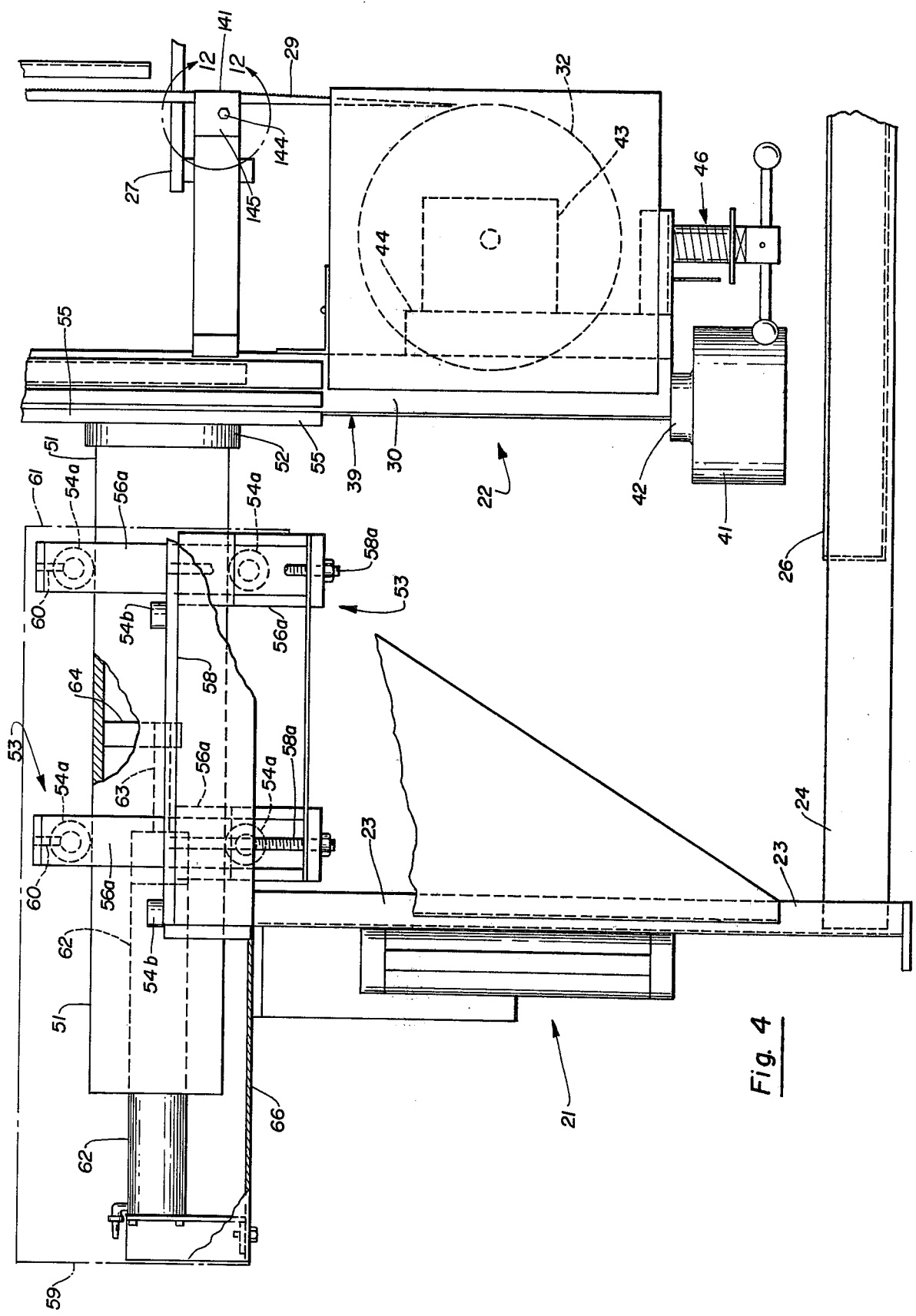
FIG. 4 is an enlarged, fragmentary, side elevational view of the vertical band saw portion of the apparatus of FIGS. 1 and 2.

Since most of the loading of arm 51 is in the vertical direction, rollers 54b normally need not withstand the same pressures. It is desirable, however, to maintain an accurate lateral alignment of arm 51 in order to insure accurate cutting. Thus, members 56b to which rollers 54b are mounted are preferably laterally adjustable by adjustment means such as a threaded shaft 65 on one side and a spring 70 on the other side (FIG. 3).

As so positioned and formed, the movable carriage support structure for the vertical band saw of the present invention is not as subject to fouling from contaminants and the like which are present adjacent cutting table 27. It is further preferable that arm 51 and guideway means 53 be enclosed by a housing shown in phantom at 59 and the front wall 61 of housing 59 can optionally be provided with an opening having a flexible wiper element or boot into and out of which arm 51 is reciprocated. The remoteness of positioning of the carriage support arm and guideways, however, has not necessitated the use of such a wiper structure for most band saw applications. The normal coolant and lubricant splatter and flying of chips and the like will not reach arm 51 or guideway means 53.

In order to facilitate tilting of carriage 22 about the longitudinal central axis of arm 51 for angular cuts, bolt 50 can be loosened and mounting plate 52 rotated with respect to plate 55 on the saw frame. It would be optionally possible to form arm 51 as a cylindrical member and rotate the same inside guide means 53, however, means for locking the arm in given angular positions would be required.

Additionally, in order to provide a compact structure, arm 51 may advantageously be formed as a hollow or tubular member with carriage drive means in the form of a pneumatic or hydraulic cylinder 62 positioned in axial alignment with and at least partially inside arm 51. The piston 63 can be attached by means of flange 64 to drive arm 51, and cylinder 62 mounted by means of bracket 66 to the remainder of the base or frame 21.

Figure 5:
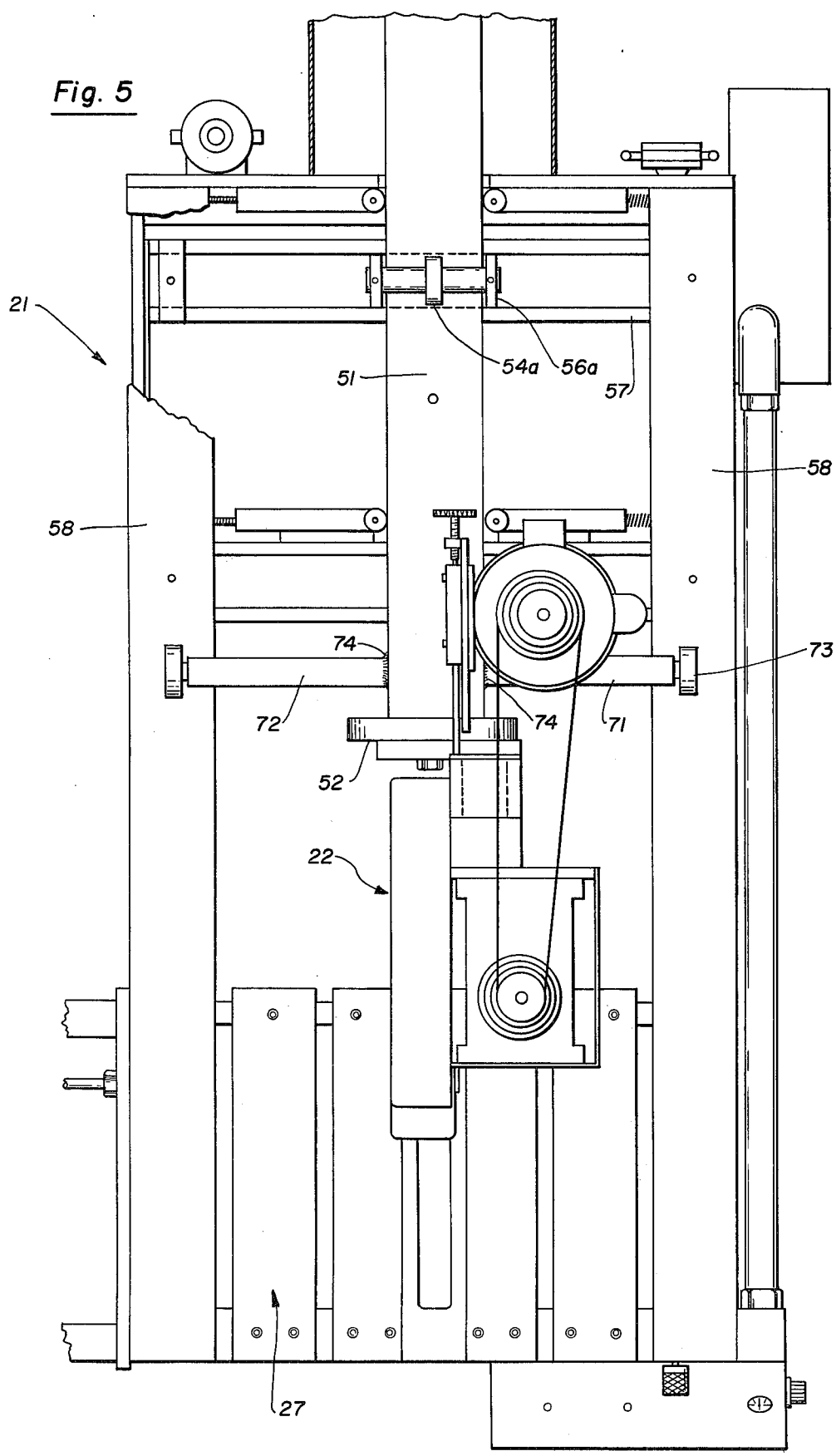
FIG. 5 is an enlarged, fragmentary view corresponding to FIG. 3 of a modified form of the vertical band saw of the present invention.

A modified form of the vertical band saw carriage support of the present invention is shown in FIG. 5. The rolling support means at the remote end of arm 51 is again provided by roller elements 54a mounted to brackets 56a and cross beams 57, as heretofore described in connection with the apparatus of FIGS. 1 through 4. The roller bearing means in the modified form of the present invention, however, further includes auxiliary arms 71 and 72 extending transversely from opposite sides of arm 51. Rolling elements 73 are carried by arms 71 and 72 and are formed for rolling engagement with a portion of base 21a, namely, longitudinally extending side beams 58. Auxiliary arms 71 and 72 are preferably affixed to arm 51, for example, by welding at 74, at a position proximate carriage 22 and more particularly carriage mounting plate 52. This structure has the advantage of providing rolling support for carriage 22 which is at the same distance from mounting plate 52 for all positions of the movable carriage during cutting. The disadvantage of this approach is that the rolling elements 73 do engage frame 21 at a position which is closer to the cutting area on table 27. Even in this modified form of the present invention, however, the rolling elements 73 are always in a position which is rearwardly and remote of the cutting stretch of the band saw blade.

It should be noted that when the form of the carriage support shown in FIG. 5 is employed, the upward forces on the carriage as a result of the saw blade cutting through the work piece may be so great as to lift the entire carriage and motor assembly upwardly. This lifting action is resisted in the form of the invention shown in FIG. 4 by the pair of rollers 54a which engage the top surface of arm 51 proximate plate 52. Accordingly, in the form of the invention in FIG. 5, the upward lifting force generated by cutting can be resisted by providing a member (not shown) which extends longitudinally above structural member 58 and will be engaged by rollers 73 to limit any upward displacement of the carriage.

In another aspect of the present invention the apparatus includes a conveying or feed table, generally designated 81, which includes a pair of longitudinally extending feed table frame elements 82 and 83 supported at one end by legs 84 and bolted by means of plate 86 to the base 21 of the vertical saw proximate work piece supporting area 27 of the saw. Mounted to the framework of the feed or conveying table 81 are transversely extending roller support assemblies 87, 88 and 89 which are positioned at substantially the same level and at the level of table 27 of the vertical band saw. Transverse roller assembly 89 also may optionally include a vertically extending frame 91 to which a hold-down roller 92 is rotatably mounted.

In order to enable feeding of the band saw, the feed or conveying table 81 is further provided with at least one movable vise 93 and preferably a stationary vise 94. Movable vise 93 is mounted to longitudinally extending viseways 96 and 97 for reciprocation to and from the band saw. Hydraulic or pneumatic drive means in the form of a cylinder 98 and piston 99 are operatively connected to vise 93 for reciprocation thereof. Automatic control mechanisms for controlling the reciprocation of the vise 93 and further for opening and closing vises 93 and 94 are not shown, but are well known in the art.

In operation, an elongated work piece is placed upon rollers 87, 88 and 89 with both vises 93 and 94 being in an open position. It should be noted that a third vise (not shown) will be mounted on band saw table 27 immediately proximate the cutting stretch of the saw blade, and this third vise will be operated automatically in unison with vise 94. Thus, both vise 94 and the third vise clamp down on the work piece, and vise 93 is reciprocated to the position farthest away from the band saw. The band saw is then used to cut off the end of the bar stock to give a starting or datum point. Vise 93 then grips the bar stock or work piece while vise 94 and the third vise at the saw table are released from the work piece. Vise 93 is then reciprocated toward the band saw so as to pull the bar stock over the rollers toward the band saw until a forward stop is reached. Once the forward stop is reached, both vise 94 and the vise on the band saw table again clamp down on the work piece.

It has been found, however, that during the process of pulling the bar stock over the rollers on the feed or conveying table that the inertia of the work piece as well as friction and the like over the rollers tends to tilt the vise 93 backwards or toward roller 87 and away from the band saw. This phenomenon is more severe, for example, when a round bar is gripped between the jaws of the vise. As best may be seen in FIG. 8, vise jaw 101 may engage a cylindrical bar at point 102 so that the force F required to pull the bar along the transverse rollers will be applied at some distance D above the viseway 97. Since there must be some clearance between the vise and viseway, the force F at distance D will cause pivoting backwardly of the vise about point $P_1$. Therefore, when movable vise 93 advances toward the band saw and reaches the stop, which acts on the vise, not the work piece, the work piece may in fact not be advanced as far toward the band saw as was desired. The pivoting of the movable vise jaw about point P, therefore, results in the work piece not being advanced to the proper position.

In the apparatus of the present invention, the backward tilting of the movable vise is stabilized in a manner which best can be seen by reference to FIGS. 6, 7 and 9. A stabilizing bar 111 is formed to be rigidly secured, for example by welding at 112 or by bolting, to movable vise 93. Bar 111 is formed to extend a substantial distance from the vise 93 in a direction away from the machine tool or band saw. Stablizing bar 111 is further formed for engagement with and bearing upon a portion of the feed table at a position remote of the vise to provide a pivot point for tilting of the vise which is a substantial distance away from the vise on the side of the vise opposite to the machine tool. One convenient way of forming the vise stabilizing apparatus of the present invention so that it may be easily attached to existing feed tables is to secure bearing surface means, such as a longitudinally extending bar or track 113, to longitudinal C-shaped side frame member 83 as by means of a bolt 114 which passes through sleeve 116 and is secured to channel 83. The upper surface 117 of bar 113 provides a bearing surface means which extends along the direction of reciprocation of the vise and which should extend over a distance at least about equal to the length of reciprocation of the vise. Mounted proximate the distal end 118 of stabilizing bar 111 is a track engaging means such as a U-shaped member 119 (best seen in FIG. 7). U-shaped element 119 can be bolted by bolt 121 to the end of stabilizing bar 111 and is formed for cooperative sliding engagement over the top surface 117 of the track 113. As shown in the drawing, stabilizing bar 111 is secured through an intermediate plate 122 which is welded at 123 to the base of movable vise 93.

FIGS. 6 and 9 can be used to explain the operation of the stabilizing bar of the present invention. When the stabilizing bar 111 is rigidly secured to the base of vise 93, the effect of the force F acting through point 102 is now changed. Instead of pivoting vise jaw 101 about point $P_1$, the stablizing bar will cause the pivoting to occur about point $P_2$. Since $P_2$ is remote of the vise and since the clearance between the vise and the viseway 97 is relatively small, the backward tilting about point $P_2$ is essentially eliminated. In FIG. 8, the backward tilting was only a few thousandths, but this can be quite significant when accurate cuts are involved. In FIG. 9, however, the pivot point has been moved far enough rearwardly of the vise so that the force F will only move the vise upwardly by the amount of slack between the vise and viseway 97, but not backwardly or rearwardly toward roller 87. Thus, each time the movable vise is used to shuttle the bar stock work piece toward the machine tool, it will accurately bring the work piece up to precisely the desired position for cutting.

Although numerous approaches can be taken to drive the movable vise, the drawings show a structure in which piston 99 from drive cylinder 98 is connected to an ear 124 which in turn is secured by pivot pin 126 to a mounting structure 127 secured to base 128 of the vise. Rearward motion of the movable vise is limited by control rod 131 having a stop 132 positioned thereon for engagement of ear 124. A second stop 133 (FIG. 2) is provided on control rod 131 to limit forward motion of the vise. Stops 132 and 133 can be selectively adjusted in accordance with the length of the bar stock pieces which are to be cut.

Finally, it should be noted that stabilizing bar 111 should be formed to resist bending about a horizontal axis transverse to the longitudinal axis of the bar so that force F will truly pivot about point $P_2$ and not bend stabilizing bar 111. It is also desirable, however, that stabilizing bar 111 not limit the lateral deflection or freedom of vise jaw 101, as indicated by arrows 134. Thus, while the section of bar 111 resists bending about a horizontal axis transverse to the bar, it does not inhibit lateral deflection or bending about a vertical axis transverse to the bar. As will also be appreciated, it would be possible to form U-shaped member 119 with some considerable space between the U-shaped channel and the width of surface 117 so as to permit lateral deflections of the vise jaws to accommodate slightly bent bar stock.

It should also be noted that U-shaped bearing member 119 need not be fixedly secured to track bar 113 in order to operate properly. It is sufficient that the U-shaped member merely rest on the top surface 117 in order to stabilize the vise. By way of example, the length of bar 111 adequate to stabilize a movable vise 93 against backward tilting has been found to be about 26 inches, although both longer and shorter stabilizing bars may be efffective. The longer the bar, the farther rearwardly will be positioned pivot point $P_2$ and the less rearward displacement will occur.

Virtually all bar stock will be bent or misaligned to some degree about the longitudinal axis thereof. Thus, there is a constant problem in connection with feeding bar stock to a saw or similar machine tool in connection with the concentration of the weight of the bar on a single roller as a result of misalignments in the bar. A 16-inch diameter steel bar, for example, weighs about 750 lbs. per lineal foot. A 30-foot long bar, therefore, will weigh 22,500 lbs. If such a bar is placed upon a feed table and is slightly bowed in an upward direction so that the convex side is lying on the feed table rollers, it will be appreciated that all or virtually all of the weight of the bar can become concentrated on a pair of rollers or a single roller, particularly if a vise is holding one end of the bar. If such a stress concentration occurs, the result can be shearing of the roller off of the conveying table or dramatic fatiguing of the roller which will greatly shorten the life of the same.

Roller support assembly designs for conveying or feed tables, such as table 81, have heretofore been constructed so that the roller bearing is positioned on a shaft which is immediately adjacent to a pillow block or the like mounted to the table frame. The shaft on which the roller elements are mounted, therefore, have been loaded primarily in shearing, and as a result little or no bending deflection transverse to the rollers occurs. What bending that does occur is often in the roller itself, and the tubular section of the roller is usually resistant to bending. Moreover, since the roller is constantly rotating, the bending in the roller itself is not desirable since it produces stress reversals which fatigue the roller material.

In the improved feed table of the present invention, an improved roller assembly is provided which is constructed so that deflection of the roller assembly occurs as a result of bending of the roller shaft so that stress concentrations induced by a bent or misaligned bar do not occur at a single roller assembly. As best may be seen in FIG. 11, the roller assembly 87 includes a central shaft means 121 terminating in shaft ends 122 and 123 mounted in mounting means, generally designated 124, formed for securement to feed table 81. Cylindrical work engaging roller 126 is mounted by bearing means, generally designated 127, to shaft 121.

As thus far described, roller assembly 87 is not regarded as being novel. In prior art roller assemblies, however, bearing means 127 is mounted to shaft 122 immediately adjacent mounting means or pillow block 124. When such a roller assembly is used, a downward force loads shaft 122 primarily in shear because the force is applied to shaft 122 by the bearing 127 at a position immediately adjacent the supporting pillow-block 124.

In the improved roller support assembly of the present invention, bearing means 127 is mounted to central shaft means 121 at a relatively spaced apart distance from mounting means 124, and central shaft 121 has a bending strength sufficient to permit downward deflection of the shaft by bending in order to accommodate load concentrations on roller 126. The spacing of bearing 127 from mounting means 124 by distance $D_1$ results in inducement of substantial bending forces in shaft 121 which in turn will deflect shaft 121 downwardly, as shown in phantom in FIG. 11. The downward deflection of the shaft produces an attendant downward deflection of roller 126. Such a downward deflection of the roller, in turn, will cause adjacent rollers on which the load is supported to pick up the load of the work piece, notwithstanding the misalignment or bowing of the same. Thus, the stress concentration is divided and dispersed among adjacent rollers by reason of bending of the roller assembly when stress concentrations occur.

The distance $D_1$ can vary depending upon the weight of the work pieces which will normally be supported on table 81. As shown in the drawings, table 81 is not designed for 30-foot long, 20,000 lb. loads, but the principle of the roller assembly of FIGS. 10 and 11 can be applied to lighter and heavier loads. The object is to have central shaft 121 act as a spring having a relatively high spring constant. Generally speaking, however, the distance $D_1$ can vary between about $\frac{1}{4}$ to about $1\frac{1}{2}$ inches, with about 1 inch being fairly typical for most applications. The shaft diameter and material from which the shaft is made, of course, affects the spring constant and accordingly the distance $D_1$. In each case, however, the roller support assembly for the conveying table is designed so that the shaft will bend, rather than being designed to avoid bending and merely load the shaft in shear.

As best may be seen in FIG. 11, it is preferable that bearing means 127 be formed as a spherical bearing with a support block 128 which mates with the outer race 129 of the bearing along a spherical surface. These mating spherical surfaces accommodate deflection of shaft 121 without unduly stressing bearing 127. In a similar fashion, pillow block 124 is preferably comprised of a pair of annular members 131 and 132 which have mating spherical surfaces accommodating deflection of shaft 121. It should be noted that the pillow block fastener 133 should be cinched down to a sufficient degree to prevent rotation of shaft 121 in the pillow block, since such rotation would produce fatiguing stress reversal in the shaft as a result of bending. Since spherical bearings 127 are designed to permit rotation, little problem is encountered in holding the ends 122 and 123 of the shaft against rotation in mounting means 124.

Figure 12:
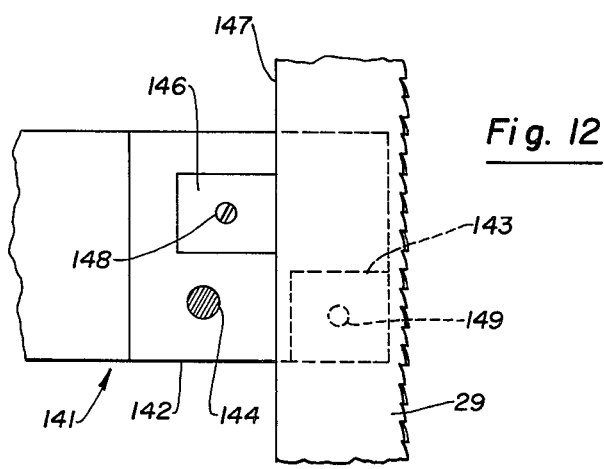
FIG. 12 is a fragmentary, enlarged view of the saw blade guide assembly bounded by line 12—12 in FIG. 4 with one side of the assembly removed.
Figure 2:
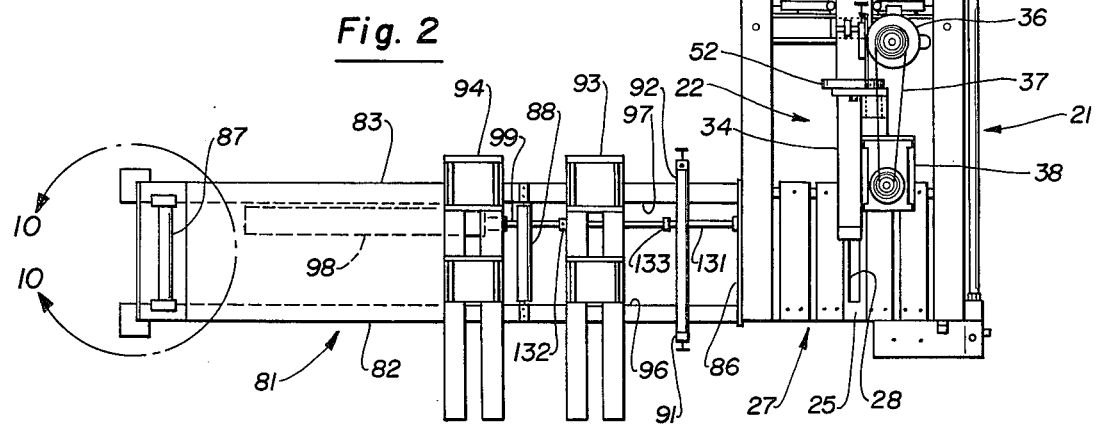
FIG. 2 is a top plan view of the vertical band saw and feed table of FIG. 1.

In a final aspect of the present invention, a band saw blade guiding assembly, generally designated 141, is provided (FIG. 12) and includes a guide housing 142 in which a pair of saw blade guiding elements are mounted in generally opposed relation to define a saw blade receiving slot therebetween. As shown in FIG. 12, housing 142 is a split housing with the outside piece 145 (shown in FIG. 4) removed. The outside piece 145 carries a saw blade guiding element which is preferably of the same size and shape as element 143 and which engages the side of saw blade 29 opposite to the side engaged by element 143 to form the saw blade receiving slot. Additionally, a bolt 144 may be used to hold the housing piece 145 to the remainder of the housing 142 and further may be used as adjustment means for selectively varying the distance between guiding element 143 and the oppositely facing guiding element carried by housing portion 145. This construction is well known in the art and is shown, for example, in my prior U.S. Pat. No. 3,848,943. In addition to the guiding elements which engage the side of band saw blade 29, a third guiding element 146 preferably engages the back edge 147 of the saw blade to enable application of cutting pressure through the guide to the blade and the work piece being cut.

In the improved saw blade guiding assembly of the present invention, guide elements 143 and the oppositely facing guide element are formed from an ablative plastic bearing material, such as nylon, teflon, or polyethylene, and adjustment means 144 is adjusted to apply a positive blade engaging pressure to the blade through the guide elements. Thus, instead of using an extremely hard tungsten carbide guide element which has been common in the art, the guide blade assembly of the present invention employs a plastic material having a surface strength far below the strength of saw blade 29.

It is known to employ plastic such as nylon in assemblies for guiding saw blades or the like. For example, U.S. Pat. Nos. 403,172, 3,452,734, 3,465,794, 3,479,097, 3,563,285, and 3,504,334 disclose various structures in which guide assemblies are employed that include synthetic or plastic materials. In these prior art assemblies, however, the plastic guide element is employed primarily to ride or fit loosely with the saw blade which is mounted therein. In the improved assembly of the present invention, the plastic guide elements 143 apply a positive gripping pressure to the blade, which has not heretofore been attempted.

It has been thought that plastics which are much softer than the saw blade could not be used to grip and guide the saw blade with a positive gripping force, for example, a force sufficient to twist the blade by 90° and be the sole support for the same. I have found, however, that a very substantial increase in the saw blade life can be achieved through the use of nylon saw blade guides in place of tungsten carbide saw blade guides. When chips or the like pass between the blade and the guides, they tend to embed, cut into and abrade or ablate the plastic guide instead of the saw blade. As a result, guides 143, and 146 (which is also preferably formed as a plastic guide), must be periodically replaced. The wear on the guides in the assembly of the present invention is much more substantial than occurs on tungsten carbide guides. This wear, however, is highly desirable as compared to fatiguing and wearing out saw blade 29. Accordingly, one can periodically replace guides 143 and 146 by simply removing bolt 144 and then removing the guide mounting fasteners 148 and 149 to replace the guides. Applying a positive pressure to the saw blade by means of the plastic guides also insures that the guides will wear in evenly.

Even when nylon guides are employed, the wear is not so great on the guides as to pose a constant replacement problem. An operator can, for example, reasonably expect nylon saw blade guides to last for about 20 to 25 hours of sawing, and this is true even though lubrication of the guides may be somewhat less than optimum. Thus, while it is easy for an operator to be attentive in setting up his saw and beginning the process, the use of nylon guides which are in positive pressure engagement with the saw blade enables the operator to be less attentive or vigilant during the entire cutting operation without unduly fatiguing or shortening the saw blade life.

What is claimed is:

1. A band saw having a base formed with guideway means therein, a carriage including a saw frame and an arm rigidly secured thereto with said arm being mounted to said guideway means for reciprocal motion with respect thereto, a pair of wheels rotatably mounted to said saw frame, a band saw blade mounted to and distended between said wheels, blade drive means operatively connected to drive said saw blade, and carriage drive means operatively connected to drive said carriage to effect cutting of a work piece, wherein the improvement in said band saw comprises:

said arm is cantilevered from said carriage to extend away from a side of said saw frame remote from the side on which said saw blade effects cutting of said work piece;

said arm is formed with a hollow portion;

said guideway means is positioned on said base on a remote side of said frame from the side on which said saw blade effects cutting; and said carriage drive means is mounted to said carriage and said base in a position in axial alignment with said arm, said carriage drive means having piston means extensible therefrom to effect driving of said carriage, and said carriage drive means being positioned at least partially inside said hollow portion of said arm with said piston means being positioned substantially entirely within said hollow portion.

* * * * *

UNITED STATES PATENT AND TRADEMARK OFFICE
CERTIFICATE OF CORRECTION

PATENT NO. : 4,117,756
DATED : October 3, 1978
INVENTOR(S) : GERALD R. HARRIS

It is certified that error appears in the above—identified patent and that said Letters Patent are hereby corrected as shown below:

In column 1, line 61, after the first appearance of the word "piece" delete "until it is cut, release the work piece".

Signed and Sealed this

Thirteenth Day of March 1979

[SEAL]

Attest:

RUTH C. MASON
Attesting Officer

DONALD W. BANNER
Commissioner of Patents and Trademarks